US012729034B2

(12) United States Patent
Noda et al.

(10) Patent No.: US 12,729,034 B2
(45) Date of Patent: Sep. 8, 2026

(54) STORAGE CONTAINER FOR LIQUID CARTRIDGE

(71) Applicant: CANON KABUSHIKI KAISHA, Tokyo (JP)

(72) Inventors: Masato Noda, Kanagawa (JP); Soji Kondo, Kanagawa (JP); Wataru Takahashi, Kanagawa (JP); Tatsuo Nanjo, Kanagawa (JP); Keisuke Iinuma, Kanagawa (JP); Hiroshi Koshikawa, Kanagawa (JP); Takayuki Nakajima, Kanagawa (JP); Takashi Hayasaka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/399,551

(22) Filed: Dec. 28, 2023

(65) Prior Publication Data

US 2024/0286787 A1 Aug. 29, 2024

(30) Foreign Application Priority Data

Feb. 28, 2023 (JP) ................................ 2023-029778

(51) Int. Cl.
*B65D 1/36* (2006.01)
*B41J 2/175* (2006.01)
(Continued)

(52) U.S. Cl.
CPC ............ *B65D 1/36* (2013.01); *B41J 2/17533* (2013.01); *B65D 77/2024* (2013.01); *B65D 81/025* (2013.01)

(58) Field of Classification Search
CPC .... B65D 1/36; B65D 77/2024; B65D 81/025; B41J 2/17533
(Continued)

(56) References Cited

U.S. PATENT DOCUMENTS 5,373,936 A * 12/1994 Kawai .................. B41J 2/16505 346/146
5,621,450 A * 4/1997 Kawai .................. B41J 2/17533 347/108
(Continued)

FOREIGN PATENT DOCUMENTS

CN 1078429 a 11/1993
CN 1616317 A 5/2005
(Continued)

OTHER PUBLICATIONS

U.S. Appl. No. 18/416,599, filed Jan. 19, 2024.
(Continued)

*Primary Examiner* — Jacob K Ackun
(74) *Attorney, Agent, or Firm* — Venable LLP

(57) ABSTRACT

A storage container includes a main body storage portion with a bottom and side walls, an opening portion facing the bottom, a first flexible rib protrudes from an inner surface of the side walls toward an inside of the storage portion and extends from near the bottom toward the opening portion. The first rib protrudes from the inner surface toward the inside of the storage container having a component oblique relative to the side walls. The first rib includes a first flat plate portion protruding from the inner surface of the storage portion, and oblique relative to the inner surface, a second flat plate portion connected to the first flat plate portion, and oblique relative to the inner surface at a tilt angle different from a tilt angle of the first flat plate portion, and a third flat plate portion connected to the second flat plate portion.

6 Claims, 8 Drawing Sheets

(51) Int. Cl.
*B65D 77/20* (2006.01)
*B65D 81/02* (2006.01)

(58) Field of Classification Search
USPC .................................................. 206/563, 576
See application file for complete search history.

(56) References Cited

U.S. PATENT DOCUMENTS

| | | | | |
|---|---|---|---|---|
| 6,062,683 A * | 5/2000 | Kawakami | B41J 2/17533 347/87 |
| 6,097,407 A * | 8/2000 | Terasawa | B41J 2/16508 347/108 |
| 6,247,598 B1 * | 6/2001 | Hosaka | B41J 2/17503 346/146 |
| 6,450,631 B1 * | 9/2002 | Hayashi | B41J 2/17513 347/108 |
| 2005/0036016 A1 | 2/2005 | Watanabe et al. | B41J 2/175 |
| 2006/0007286 A1 | 1/2006 | Ogawa et al. | B41J 2/175 |
| 2008/0049080 A1 | 2/2008 | Hayashi et al. | B41J 2/175 |
| 2009/0179979 A1 | 7/2009 | Nanjo et al. | B41J 2/175 |
| 2009/0290003 A1 | 11/2009 | Udagawa et al. | B41J 2/175 |
| 2011/0096128 A1 | 4/2011 | Ogura et al. | B41J 2/175 |
| 2012/0300003 A1 | 11/2012 | Takada et al. | B41J 2/175 |
| 2013/0222488 A1 | 8/2013 | Miyashita et al. | B41J 2/175 |
| 2013/0222491 A1 | 8/2013 | Nanjo et al. | B41J 2/175 |
| 2015/0375512 A1 | 12/2015 | Kondo et al. | B41J 2/175 |
| 2015/0375514 A1 | 12/2015 | Koshikawa et al. | B41J 2/175 |
| 2016/0200113 A1 | 7/2016 | Nanjo et al. | B41J 2/175 |
| 2016/0200114 A1 | 7/2016 | Nanjo et al. | B41J 2/175 |
| 2016/0347071 A1 | 12/2016 | Saeki et al. | B41J 2/175 |
| 2017/0120606 A1 | 5/2017 | Koshikawa et al. | B41J 2/175 |
| 2017/0120608 A1 | 5/2017 | Takaoka et al. | B41J 2/175 |
| 2017/0120609 A1 | 5/2017 | Kimura et al. | B41J 2/175 |
| 2017/0120612 A1 | 5/2017 | Fukuchi et al. | B41J 2/175 |
| 2017/0120613 A1 | 5/2017 | Ikebe et al. | B41J 2/175 |
| 2017/0326882 A1 | 11/2017 | Okude et al. | B41J 2/175 |
| 2019/0009561 A1 | 1/2019 | Mukoyama et al. | B41J 2/175 |
| 2019/0009562 A1 | 1/2019 | Abe et al. | B41J 2/165 |
| 2019/0163091 A1 | 5/2019 | Koshikawa et al. | G03G 15/08 |
| 2019/0168508 A1 | 6/2019 | Kondo | B41J 2/14 |
| 2019/0299649 A1 | 10/2019 | Shimoyama et al. | B41J 2/045 |
| 2019/0299650 A1 | 10/2019 | Saeki et al. | B41J 2/18 |
| 2020/0079096 A1 | 3/2020 | Iinuma et al. | B41J 2/175 |
| 2020/0108624 A1 | 4/2020 | Takahashi et al. | B41J 2/175 |
| 2020/0316973 A1 | 10/2020 | Toki et al. | B41J 29/38 |
| 2021/0300052 A1 | 9/2021 | Takei et al. | B41J 2/175 |
| 2021/0300055 A1 | 9/2021 | Koshikawa et al. | B41J 2/175 |
| 2021/0362506 A1 | 11/2021 | Kishikawa et al. | B41J 2/175 |
| 2022/0009244 A1 | 1/2022 | Matsumura et al. | B41J 2/175 |
| 2022/0016893 A1 | 1/2022 | Nagai et al. | B41J 2/175 |
| 2022/0016894 A1 | 1/2022 | Nagaoka et al. | B41J 2/175 |
| 2022/0032633 A1 | 2/2022 | Shimada et al. | B41J 2/175 |
| 2022/0097388 A1 | 3/2022 | Nanjo et al. | B41J 2/175 |
| 2022/0258487 A1 | 8/2022 | Jonouchi et al. | B41J 2/175 |
| 2023/0135411 A1 | 5/2023 | Koshikawa | B41J 2/175 |
| 2023/0139685 A1 | 5/2023 | Koshikawa | B41J 2/175 |
| 2023/0302806 A1 | 9/2023 | Noda et al. | B41J 2/175 |
| 2023/0405995 A1 | 12/2023 | Shimada et al. | B41J 2/175 |

FOREIGN PATENT DOCUMENTS

| | | | |
|---|---|---|---|
| DE | 19810920 | C1 | 6/1999 |
| EP | 0999061 | A2 | 5/2000 |
| JP | H05270002 | A | 10/1993 |
| JP | H0858112 | A | 3/1996 |
| JP | 2001-010082 | | 1/2001 |
| JP | 2006159512 | A | 6/2006 |
| JP | 2022029848 | A | 2/2022 |

OTHER PUBLICATIONS

U.S. Appl. No. 18/524,987, filed Nov. 30, 2023.
U.S. Appl. No. 18/628,695, filed Apr. 6, 2024.
Chinese Office Action issued Jul. 10, 2026, in corresponding Chinese Patent Application No. 2024101997590, with English translation (19 pages).

* cited by examiner

STORAGE CONTAINER FOR LIQUID CARTRIDGE

BACKGROUND OF THE DISCLOSURE

Cross Reference to Priority Application

This application claims the benefit of Japanese Patent Application No. 2023-029778, filed on Feb. 28, 2023, which is hereby incorporated by reference in its entirety.

Field of the Disclosure

The present disclosure relates to a storage container for a liquid cartridge.

Description of the Related Art

An inkjet printing apparatus that performs desired printing by ejecting inks from a print head are equipped with ink tanks that store the inks and the print head, which ejects the inks stored in the ink tanks. There exists a type of inkjet printing apparatus in which ink cartridges being ink tanks in the form of cartridges and a print head cartridge being a print head in the form of cartridge are mounted as separate components. There also exists a type of inkjet printing apparatus in which a print head-attached ink cartridge being ink tanks and a print head combined in the form of a cartridge is mounted.

For distribution, the print head cartridge is stored in a storage container for the print head cartridge with the print head's ink ejection port sealed. A so-called blister pack is often used as the storage container for the print head cartridge. Likewise, the print head-attached ink cartridge is stored in a storage container for the print head-attached ink cartridge with the print head's ink ejection port sealed. A so-called blister pack is often used as the storage container for the print head-attached ink cartridge as well. Here, a storage container for a print head cartridge disclosed in Japanese Patent Laid-Open No. 2001-10082 (hereafter referred to as the '082 document) includes a main body having an opening portion at a plane opposed to a bottom surface and a holding portion that holds the print head cartridge inside. This storage container for a print head cartridge also includes a lid that closes the opening portion of the main body. Moreover, a substantially cylindrical rib extends on a side portion of the main body from the bottom surface toward the opening portion. The storage container for a print head cartridge disclosed in the '082 document discloses a configuration that prevents deformation by changes in external environments (such as temperature and pressure) during the distribution to protect the print head cartridge from the environmental changes.

The substantially cylindrical rib formed on the storage container for a print head cartridge disclosed in the '082 document is used to prevent deformation of the whole storage container due to changes in external environments (such as temperature and pressure). Here, in case when the storage container is dropped or in a similar situation, the shock is transmitted to the print head cartridge from the storage container through the substantially cylindrical rib. This may break the print head cartridge. In particular, there are ink cartridges and print head-attached ink cartridges filled with large amounts of inks for the purpose of ensuring a large number of pages to be printed. These cartridges are relatively heavy, which leads to a problem that they receive a larger shock in a case when they are dropped.

SUMMARY OF THE DISCLOSURE

The present disclosure provides a storage container for a liquid cartridge including a main body having a storage portion in which to store the liquid cartridge, and an opening portion through which to put the liquid cartridge in and out, and at least one rib being flexible and arranged in a gap space formed between the storage portion and the liquid cartridge in a state where the liquid cartridge is stored in the storage portion, the at least one first rib being arranged in the gap space so as to protrude in a direction along an inner surface of the storage portion and in an inward direction from the inner surface of the storage portion and extend from around a bottom of the storage portion facing the opening portion toward the opening portion.

Further features of the present disclosure will become apparent from the following description of exemplary embodiments with reference to the attached drawings.

DESCRIPTION OF THE EMBODIMENTS

An embodiment of the present disclosure will be described in detail below with reference to the drawings.

First Embodiment

<Print Head-Attached Ink Cartridge>

Figure 1A:
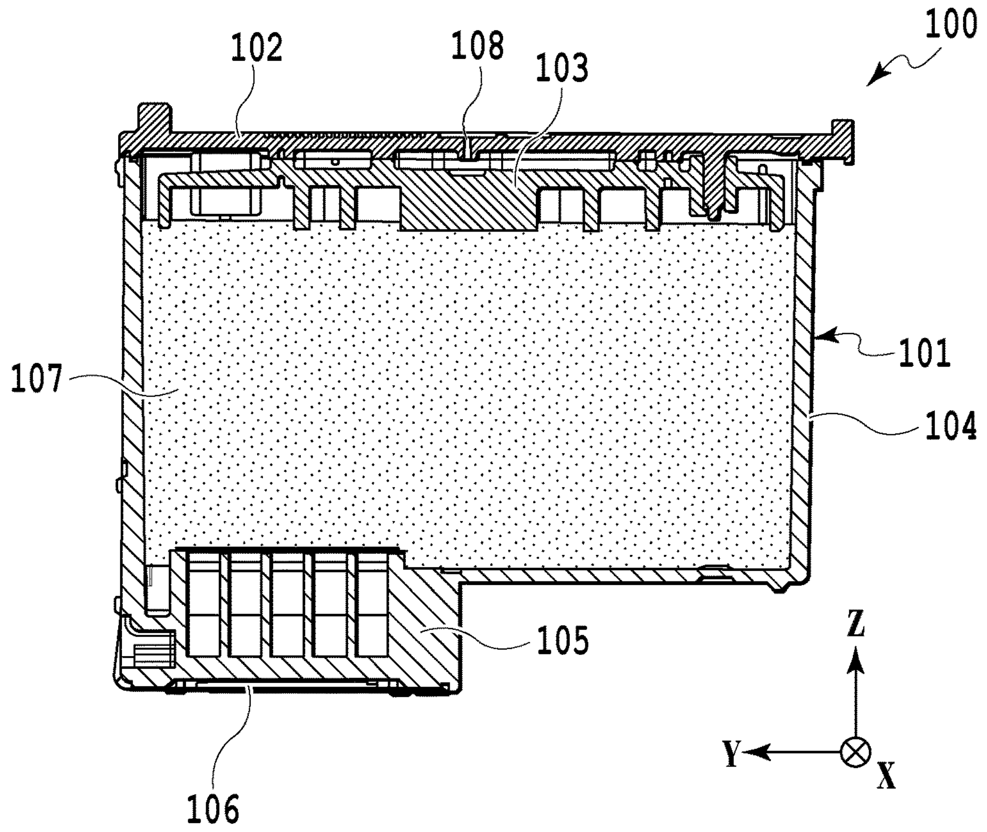
FIG. 1A is a side cross-sectional view of a print head-attached ink cartridge.
Figure 1B:
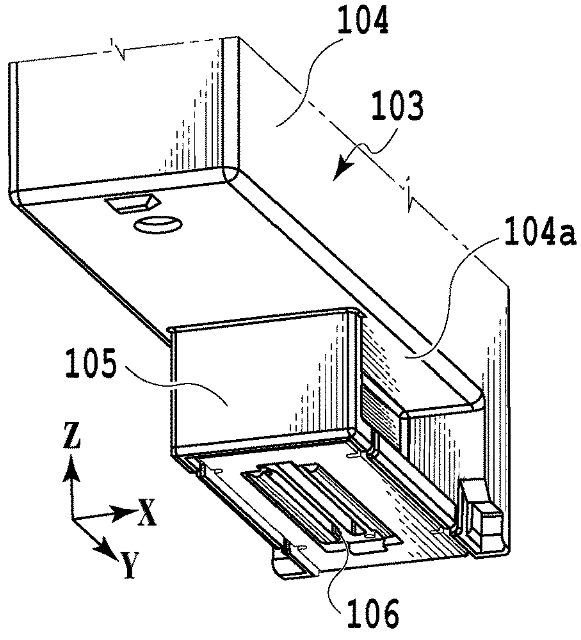
FIGS. 1B and 1C are perspective views of the print head-attached ink cartridge.
Figure 1C:
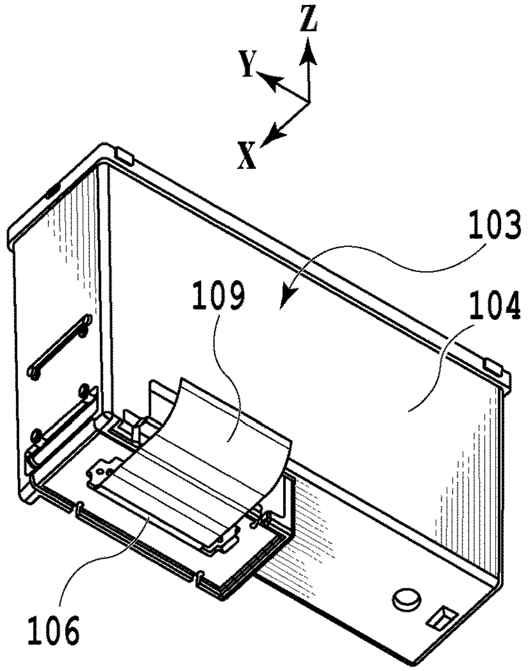

FIG. 1A illustrates a side cross-sectional view of a print head-attached ink cartridge. FIGS. 1B and 1C illustrate perspective views of the print head-attached ink cartridge. A print head-attached ink cartridge 100 (hereafter referred to as "ink cartridge") has a tank case 101, a tank lid 102, and a ribbed plate 103. The tank case 101 has an ink chamber 104, a head portion 105 and an ink ejection port 106.

An absorber 107 for holding inks is filled inside the ink chamber 104. An atmosphere communication port 108 is formed in the tank lid 102. The ribbed plate 103 is disposed between the absorber 107 and the tank lid 102.

The head portion 105 is connected to the bottom of the ink chamber 104. The head portion 105 is narrower than the ink chamber 104. As a result, shoulder portions 104*a* are formed around the portion of the bottom of the ink chamber 104 to which the head portion 105 is connected. The ejection port 106 is arranged at the lower tip of the head portion 105.

In a case when the ink cartridge 100 falls over, the absorber 107 holds the inks. In a case when the inks come out of the absorber 107, the ribbed plate 103 blocks the inks moving toward the atmosphere communication port 108. Thus, even in a case when the ink cartridge 100 falls over, the inks are prevented from leaking out.

In printing, the inks inside the ink chamber 104 are ejected through the ink ejection port 106. As the amounts of the inks inside the ink chamber 104 decrease as a result of the ejection, air gets introduced into the ink chamber 104 through the atmosphere communication port 108.

Before the ink cartridge 100 is stored in a storage container 110 to be described later, a piece of protection tape 109 is attached to so as to extend over the ink ejection port 106 and a lower end portion of the ink chamber 104, as illustrated in FIG. 1C.

<Storage Container for Print Head-Attached Ink Cartridge>

Next, the storage container 110 for storing the ink cartridge 100 in the present disclosure (hereafter referred to as "a storage container") will be described in detail.

Figure 2:
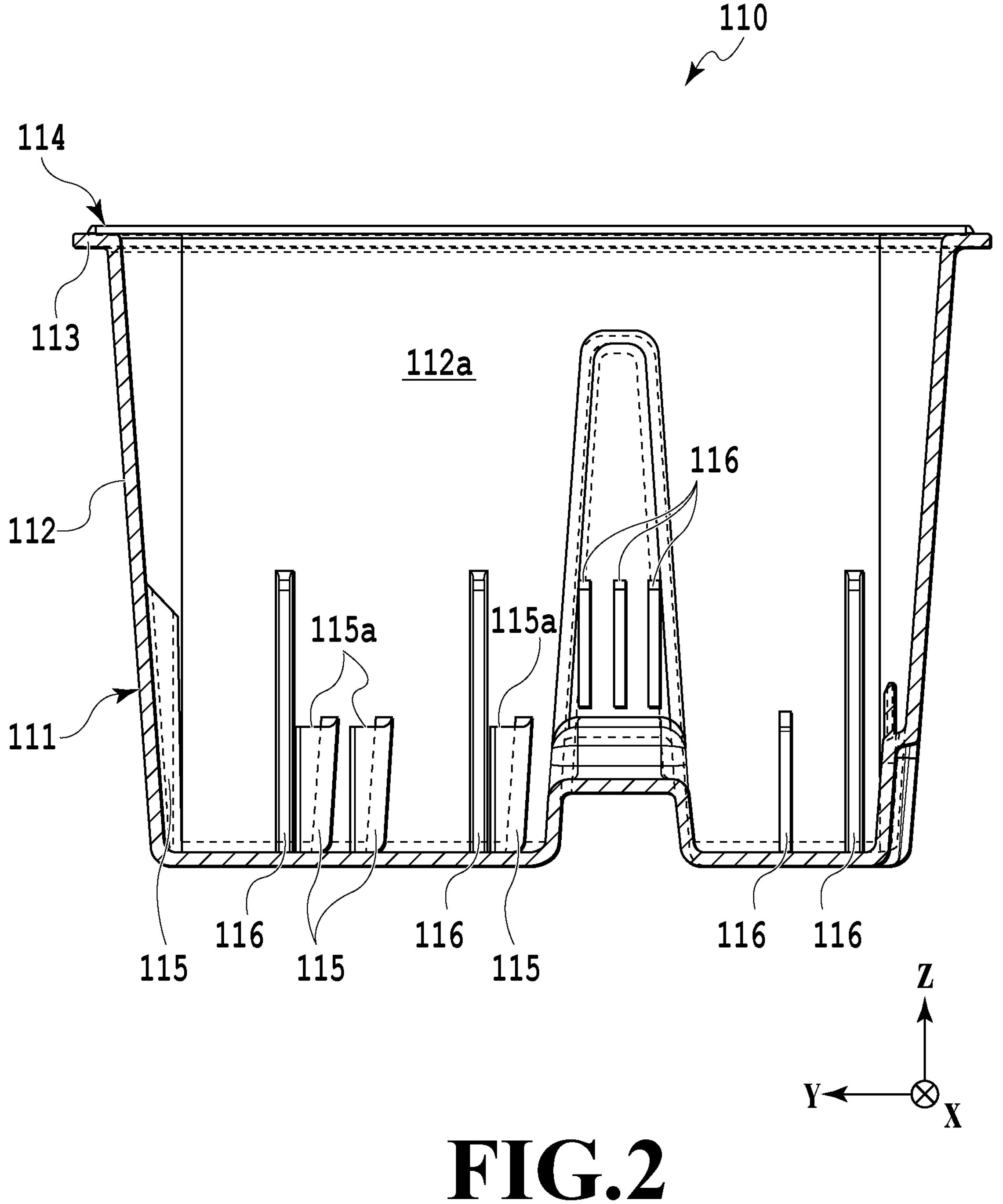
FIG. 2 is a side cross-sectional view of a storage container for the print head-attached ink cartridge.
Figure 3A:
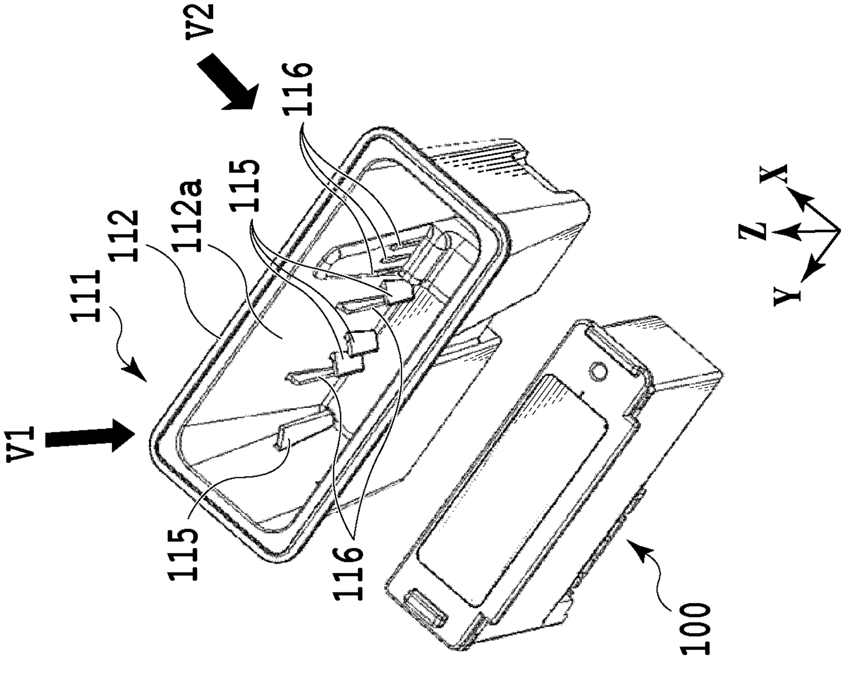
FIGS. 3A to 3C are perspective views of the storage container for the print head-attached ink cartridge and the print head-attached ink cartridge.
Figure 3B:
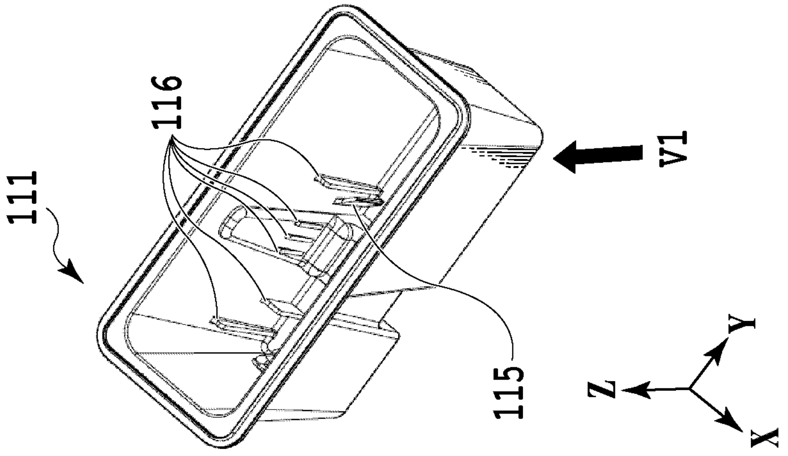
Figure 3C:
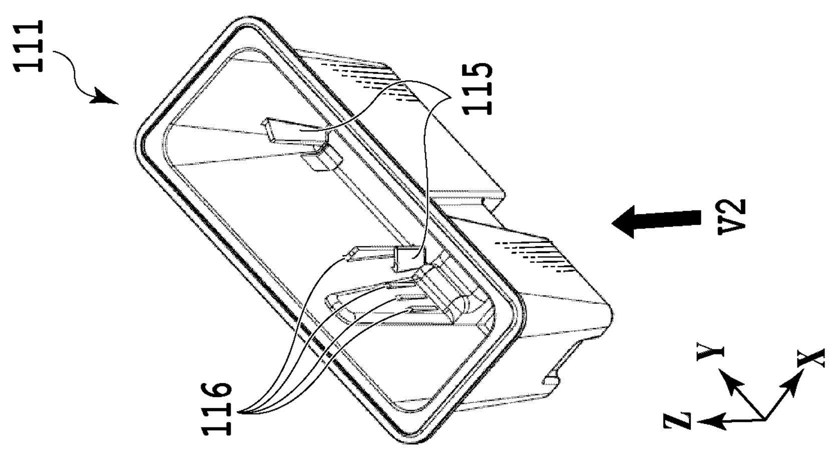
Figure 4A:
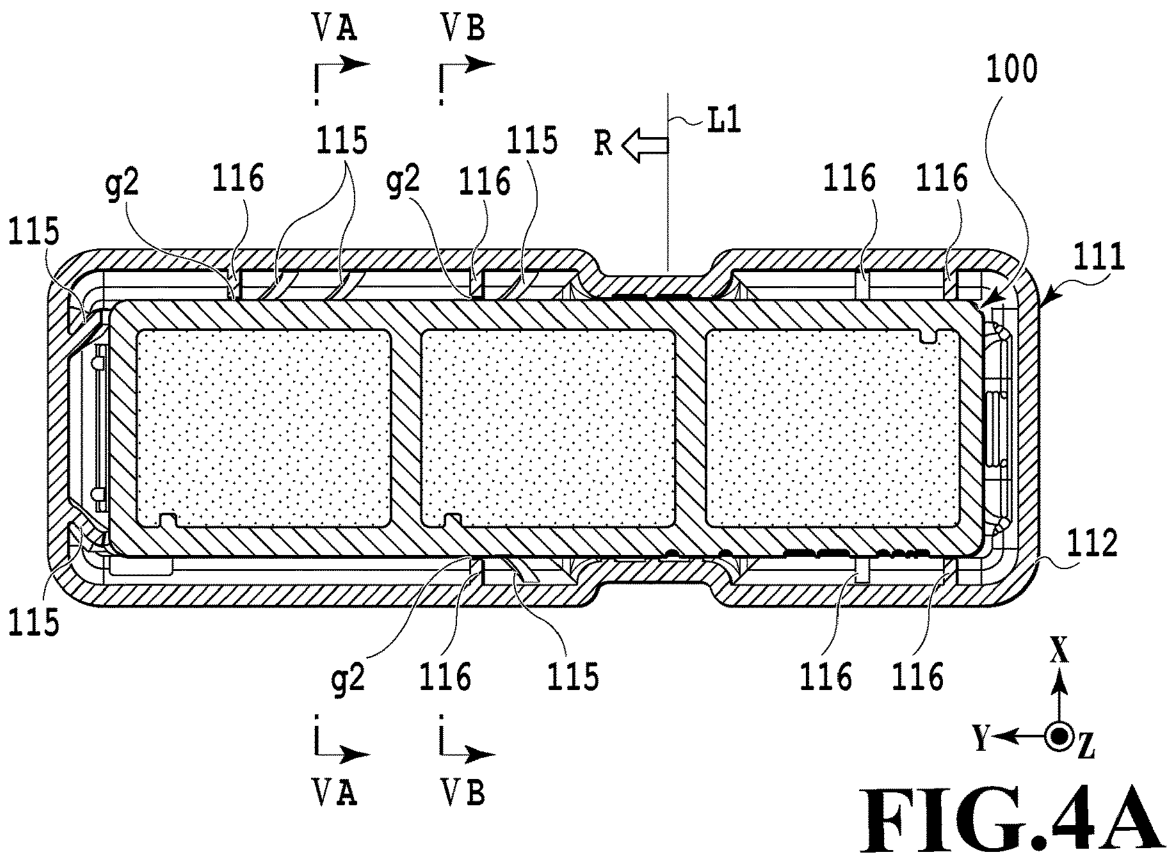
FIGS. 4A and 4B are top cross-sectional views of the storage container for the print head-attached ink cartridge and the print head-attached ink cartridge stored in this storage container.
Figure 4B:
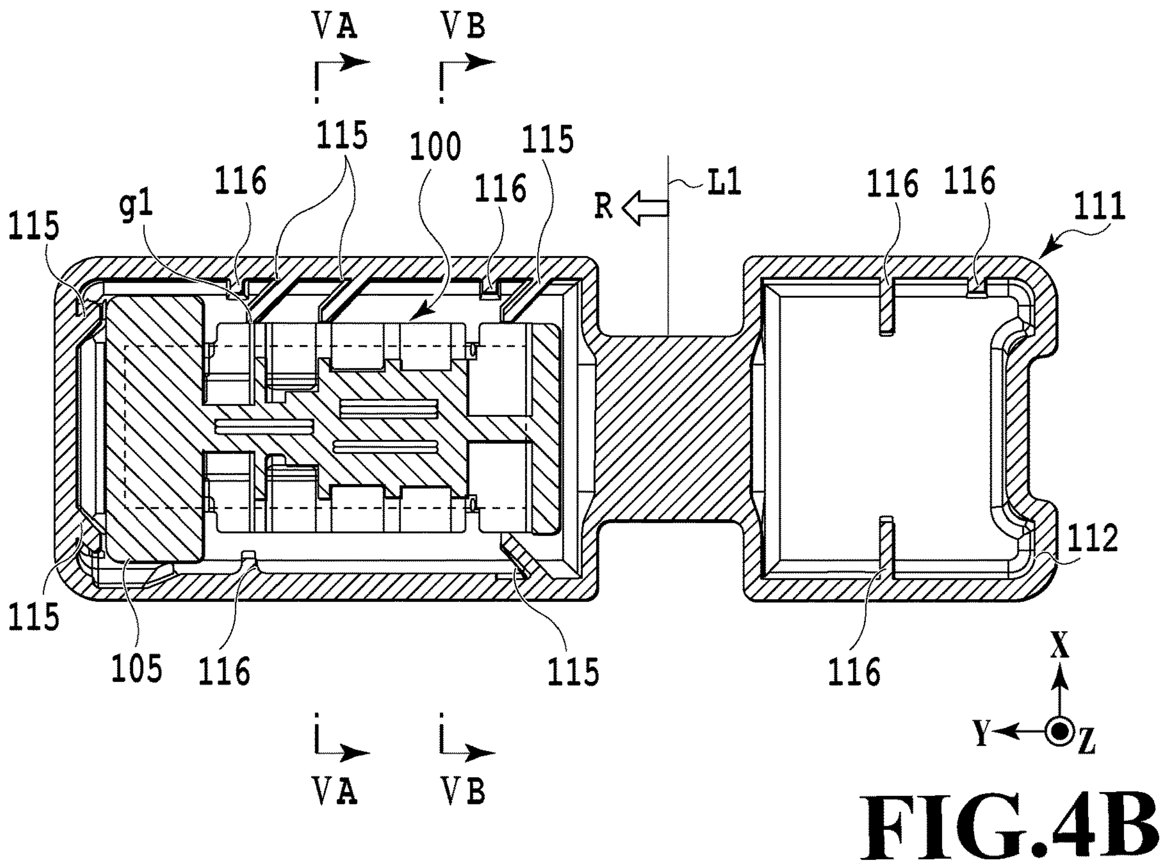
Figure 5A:
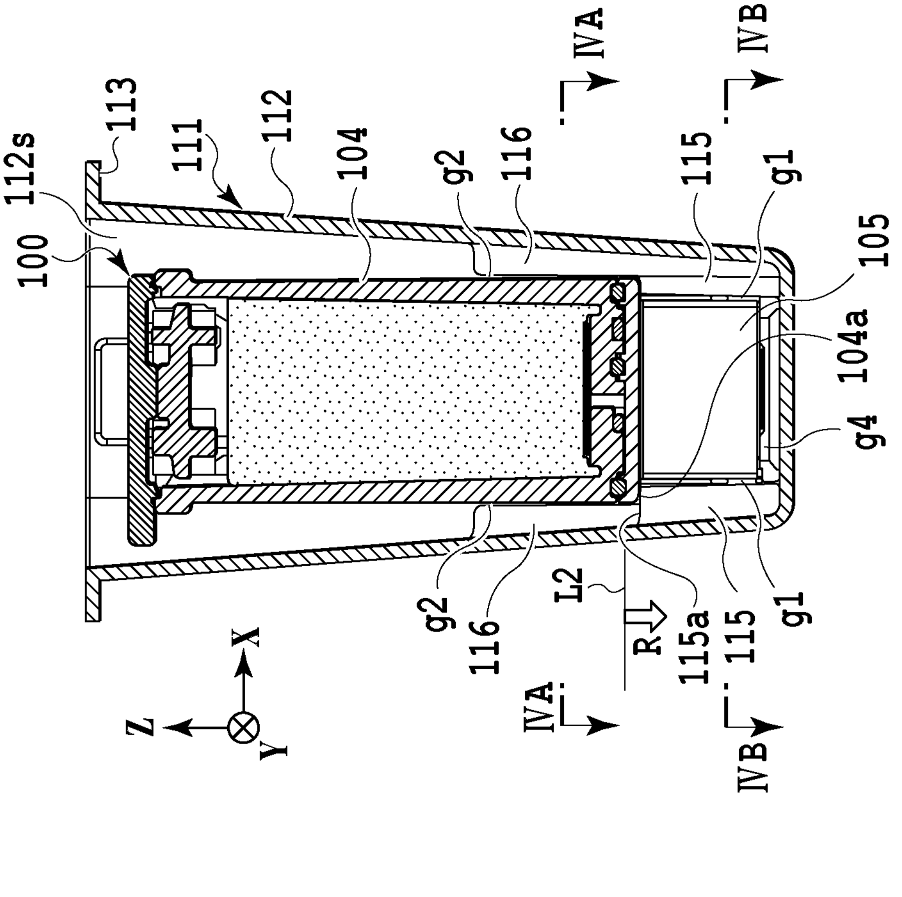
FIGS. 5A and 5B are front cross-sectional views of the storage container for the print head-attached ink cartridge and the print head-attached ink cartridge stored in this storage container.
Figure 5B:
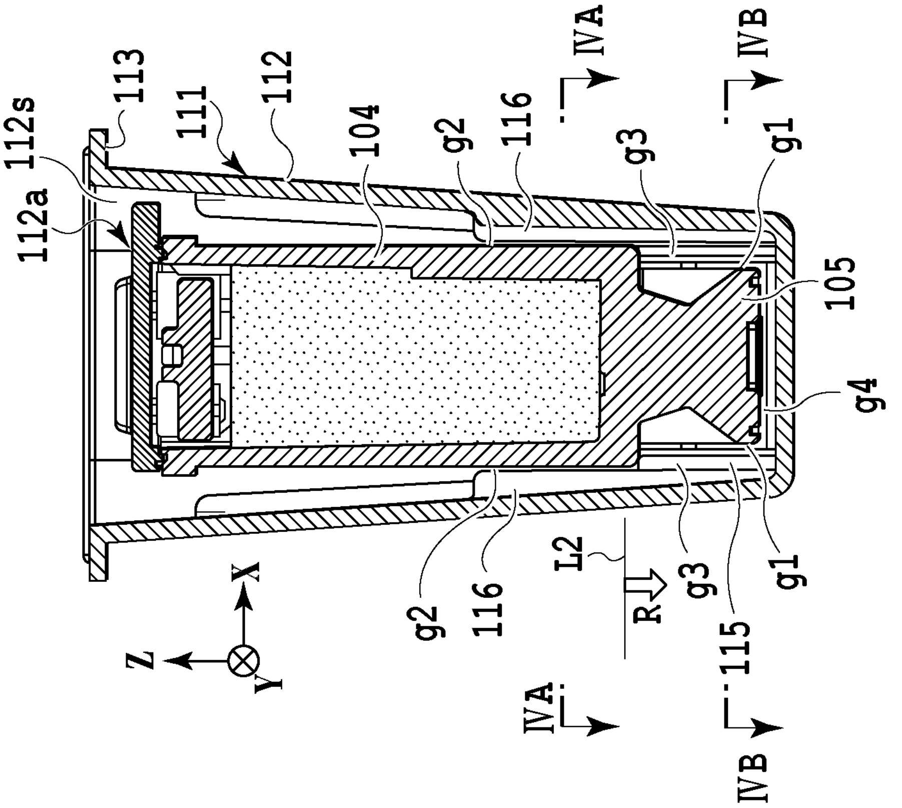
Figures 6A, 6B, 6C, 6D:
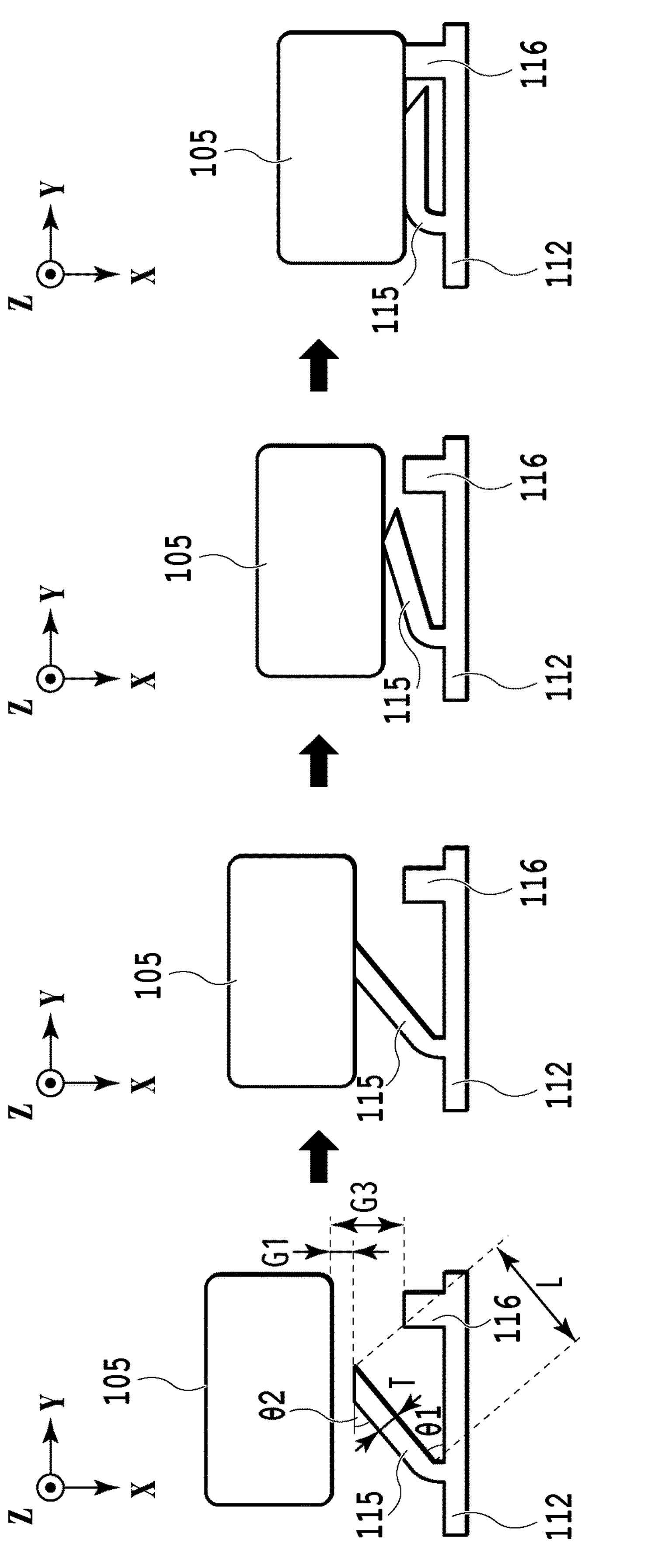
FIGS. 6A to 6D are views indicating that a flexible rib gets bent to exert an elastic effect when the storage container for the print head-attached ink cartridge is dropped.
Figure 7:
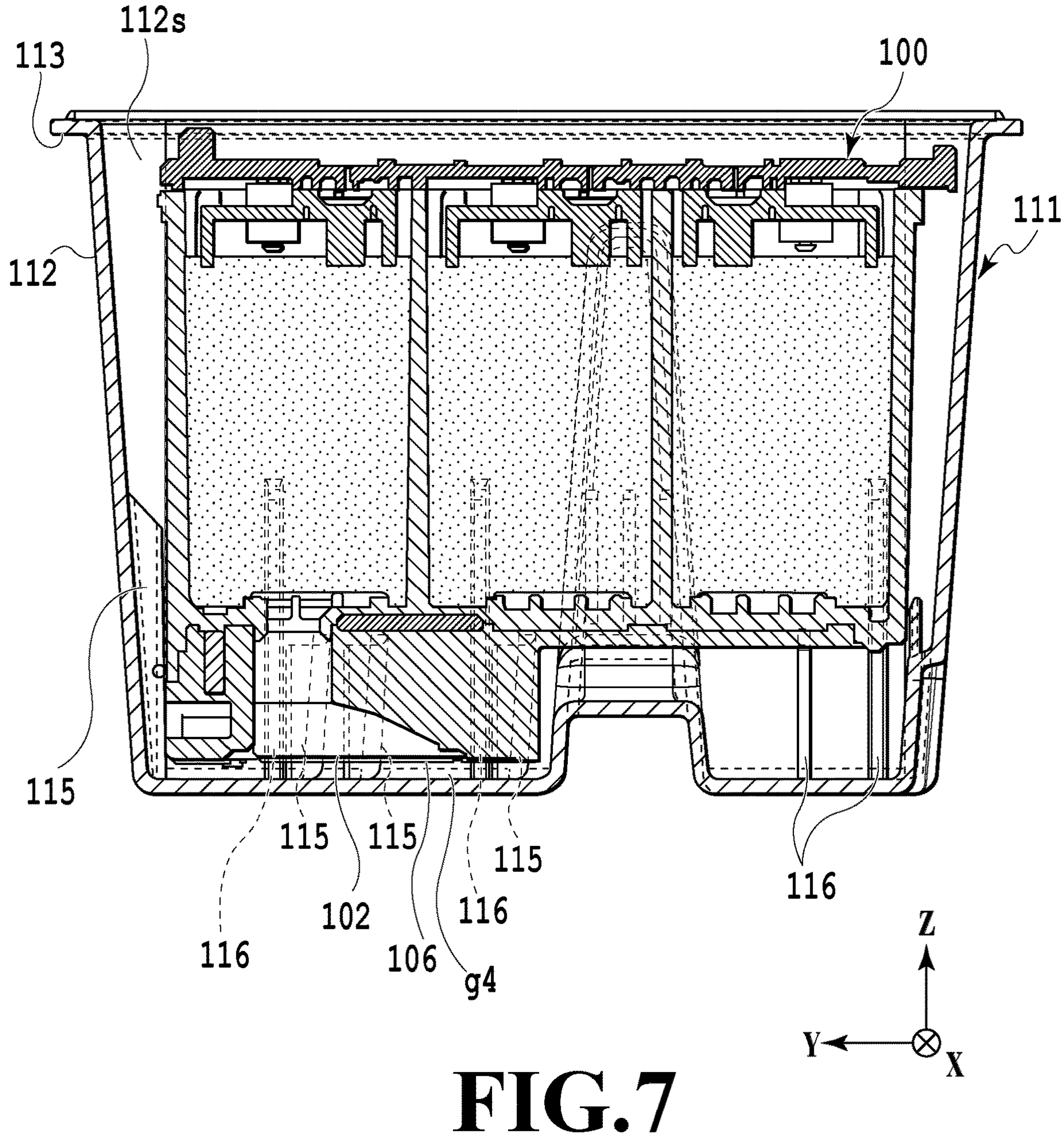
FIG. 7 is a side cross-sectional view of the storage container for the print head-attached ink cartridge and the print head-attached ink cartridge stored in this storage container.
Figure 8A:
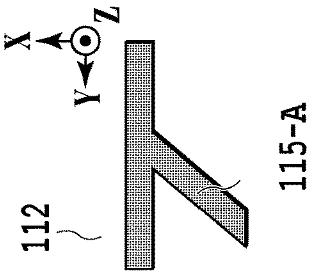
FIGS. 8A to 8K are cross-sectional views illustrating flexible ribs with various shapes.
Figure 8B:
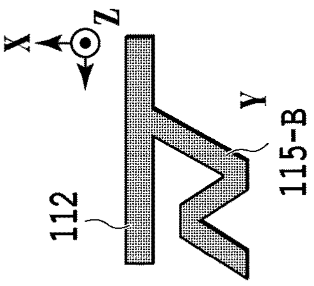
Figure 8C:
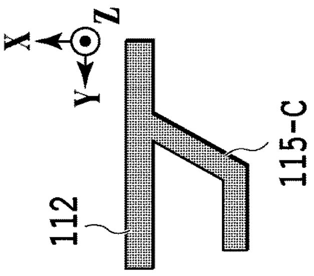
Figure 8D:
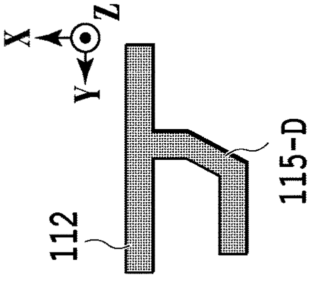
Figure 8E:
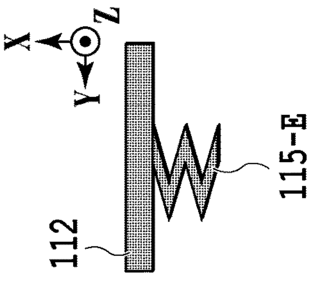
Figure 8F:
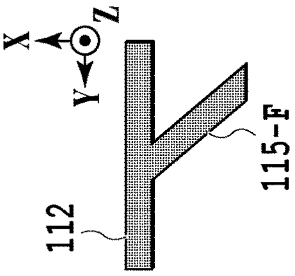
Figure 8G:
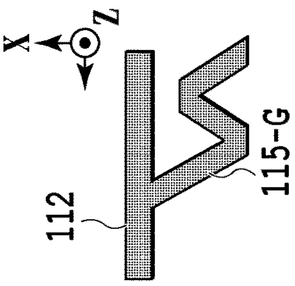
Figure 8H:
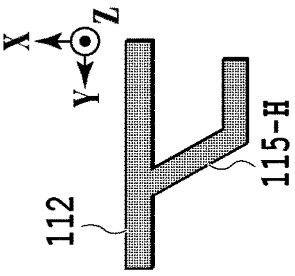
Figure 8I:
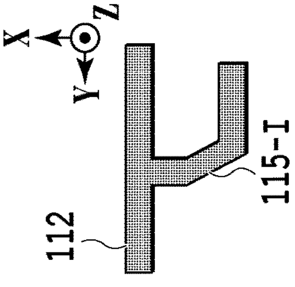
Figure 8J:
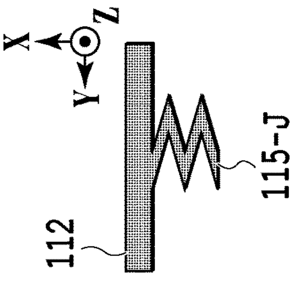
Figure 8K:
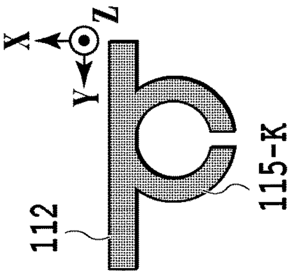

FIG. 2 is a side cross-sectional view of the storage container 110. FIG. 3A is a perspective view of the storage container 110 and the ink cartridge 100. FIG. 3B is a perspective view of the storage container 110 as seen from the direction indicated by an arrow V1 in FIG. 3A. FIG. 3C is a perspective view of the storage container 110 as seen from the direction indicated by an arrow V2 in FIG. 3A. FIG. 4A is a top cross-sectional view of the storage container 110 and the ink cartridge 100 stored in the storage container 110 taken along a section line IVA-IVA in FIG. 5A. FIG. 4B is a top cross-sectional view taken along a section line IVB-IVB in FIG. 5A. FIG. 5A is a front cross-sectional view taken along a section line VA-VA in FIG. 4A. FIG. 5B is a front cross-sectional view taken along a section line VB-VB in FIG. 4A. FIGS. 6A to 6D are views for explaining that flexible ribs 115 get bent to exert an elastic effect when the storage container 110 is dropped. FIG. 7 is a side cross-sectional view of the storage container 110 and the ink cartridge 100 stored in the storage container 110. FIGS. 8A to 8K are cross-sectional views of flexible ribs 115-A to 115-K with various shapes along a section perpendicular to their extending direction (Z direction) along the storage container 110 (XY section).

Referring to FIG. 2, the storage container 110 includes a main body 111 and a lid 114. The main body 111 includes: a storage portion 112 forming therein a storage space 112*a* to store the ink cartridge 100; and a flange portion 113 extending radially outward from an opening portion of the storage portion 112. The ink cartridge 100 can be stored in the storage portion 112 from above the storage portion 112 through the opening portion of the storage portion 112.

After the ink cartridge 100 is stored in the storage portion 112, the lid 114 is joined to the flange portion 113, thereby forming a tightly closed space. A polyethylene terephthalate (PET) film is used as the material of the lid 114. Polypropylene (PP) is used as the material of the storage container 110. The joint between the storage container 110 and the lid 114 is sealed by heat sealing.

Referring to FIGS. 2, 3A to 3C, 4A, 4B, 5A, and 5B, the main body 111 includes multiple flexible ribs 115 and multiple regular ribs 116 on the inner side surface of the storage portion 112. The multiple flexible ribs 115 and the multiple regular ribs 116 extend inward from the inner side surface of the storage portion 112. That is, the multiple flexible ribs 115 and the multiple regular ribs 116 protrude toward the storage space 112*a* from the inner side surface of the storage portion 112.

As illustrated in FIGS. 4A, 4B, 5A, and 5B, in a state where the ink cartridge 100 is stored in the storage portion 112, the cartridge 100 occupies a most part of the storage space 112*a*. A gap space 112*s* is formed between the storage portion 112 and the ink cartridge 100. The gap space 112*s* is the storage space 112*a* excluding the space occupied by the cartridge 100.

In the top cross-sectional view of FIG. 4A, the flexible ribs 115 are tilted with respect to the inner side surface of the storage portion 112 and also the outer side surface of the ink cartridge 100. Specifically, the direction in which each flexible rib 115 extends inward includes a component oblique to the outer surface of the ink cartridge 100 in the state where the ink cartridge 100 is stored in the storage portion 112 across the entire range in which the flexible rib 115 extends. Incidentally, in some of the examples of FIGS. 8A to 8K to be described later, the direction in which the flexible rib 115 extends inward includes a component oblique to the outer surface of the ink cartridge 100 in the state where the ink cartridge 100 is stored in the storage portion 112 across a part of the range in which the flexible rib 115 extends. The some of the examples of FIGS. 8A to 8K to be described later refer to the flexible ribs 115-B to 115-D and 115-G to 115-I.

As illustrated in FIG. 4A, the ink cartridge 100 has a rectangular cross-sectional shape while the storage portion 112 also has a rectangular cross-sectional shape, and each side of the ink cartridge 100 is parallel to the corresponding side of the storage portion 112. Thus, the direction in which each flexible rib 115 extends inward in an XY plane can be considered to include a component oblique to the inner surface of the storage portion 112 in the state where the ink cartridge 100 is stored in the storage portion 112 across the entire flexible rib 115.

In the top cross-sectional view of FIG. 4A, each regular rib 116, on the other hand, preferably protrudes in a direction crossing the inner side surface of the storage portion 112 at an angle of eight-five to ninety-five degrees and more preferably protrudes perpendicularly. Moreover, each regular rib 116 preferably protrudes in a direction crossing the outer side surface of the ink cartridge 100 at an angle of eight-five to ninety-five degrees and more preferably projects perpendicularly. FIG. 4A illustrates a case when each regular rib 116 protrudes in a direction crossing the inner side surface of the storage portion 112 and the outer side surface of the ink cartridge 100 at an angle of 90 degrees.

Referring to FIGS. 4A and 5A, in the state where the ink cartridge 100 is stored in the storage portion 112, the head portion 105 is stored in a head storage region R which is situated to the left of a line L1 in a top view and under a line L2 in a front view. Six flexible ribs 115 are provided in the head storage region R. In the cross-sectional view of FIG. 4A, three flexible ribs 115, two flexible ribs 115, and one flexible rib 115 are arranged on the upper, left, and lower sides of the ink cartridge 100, respectively.

In the cross-sectional view of FIG. 4A, two regular ribs 116 are arranged around the three flexible ribs 115 on the upper side of the ink cartridge 100. In the cross-sectional view of FIG. 4A, one regular rib 116 is arranged around the one flexible rib 115 on the lower side of the ink cartridge 100. In other words, three regular ribs 116 are provided in the head storage region R. In the cross-sectional view of FIG. 4A, two regular ribs 116 are also arranged on each of the upper and lower sides of the right half. In other words, regular ribs 116 are provided in a region other than the head storage region R. Also, the three regular ribs 116 provided in the head storage region R extend also in a region above the head storage region R (the region above the line L2). This also counts as regular ribs 116 provided in a region other than the head storage region R.

Referring to FIGS. 6A to 6D, each flexible rib 115 preferably has a thickness T of 0.5 to 1.0 mm in its width direction (a direction perpendicular to the inward extension direction in the XY plane), and more preferably has a thickness T of 0.6 mm. Moreover, each flexible rib 115 preferably has a length L of 2.0 mm or more along its inward extension direction (the inward extension direction in the XY plane) and more preferably has a length L of 2.8 mm. As illustrated in FIGS. 5A and 5B, the length of each flexible rib 115 along its vertical extending direction (Z direction) is greater than the height of the head portion 105. In this way, a gap g4 is provided between the storage portion 112 and the ejection port 106 at the lower tip of the head portion 105, as will be described later.

Referring to FIG. 6, the extending direction of each flexible rib 115 (the inward extending direction in the XY plane) is preferably a direction crossing the inner side surface of the storage portion 112 at an angle θ1 of 30 to 45 degrees. The extending direction of each flexible rib 115 is more preferably a direction crossing the inner side surface of the storage portion 112 at an angle θ1 of forty-five degrees. Moreover, in a case when the outer side surface of the ink cartridge 100 is parallel to the inner side surface of the storage portion 112, the extending direction of each flexible rib 115 is preferably a direction crossing the outer side surface of the ink cartridge 100 at an angle θ2 of thirty to forty-five degrees. The extending direction of each flexible rib 115 is more preferably a direction crossing the inner side surface of the storage portion 112 at an angle θ2 of forty-five degrees.

The flexible ribs 115 are flexible. Thus, in a case when the storage container 110 with the ink cartridge 100 stored therein is dropped on the ground or the like, some of the flexible ribs 115 get deformed by the shock as illustrated in FIGS. 6A to 6D. Specifically, as illustrated in FIG. 6A, during a normal state with no shock, the head portion 105 is separated from the flexible ribs 115 by a distance G1 and separated from the regular ribs 116 by a distance G3. The distance G3 is longer than the distance G1. As illustrated in FIG. 6B, in a case when the storage container 110 receives a shock, the head portion 105 firstly comes into abutment with some of the flexible ribs 115. At this point, the head portion 105 still remains separated from the regular ribs 116 around it. As illustrated in FIG. 6C, as the shock further displaces the head portion 105 relative to the storage portion 112, the flexible ribs 115 get elastically bent. At this point too, the head portion 105 still remains separated from the regular ribs 116 around it. Then, as illustrated in FIG. 6D, the head portion 105 gets displaced relative to the storage portion 112 while further bending the flexible ribs 115 until the head portion 105 comes into abutment with some of the regular ribs 116. The elastic force of the flexible ribs 115 increases the more the flexible ribs 115 are bent. Thus, even in a case when a shock is externally applied, the flexible ribs 115 absorb the shock and therefore relax the shock to be applied to the head portion 105. The head portion 105 gets displaced from the position illustrated in FIG. 6A to the position illustrated in FIG. 6D at most. In a case when the shock is not too strong, the head portion 105 will only get displaced to a position as illustrated in FIG. 6C. In a case when the shock is strong, the head portion 105 will get displaced as far as a position as illustrated in FIG. 6D. At the position illustrated in FIG. 6D, the head portion 105 comes into abutment with the regular ribs 116 and will therefore not get displaced any further. Hence, the regular ribs 116 are capable of limiting the distance of the displacement of the head portion 105 in the storage portion 112.

Note that the flexible ribs 115 and the regular ribs 116 are molded integrally with the main body 111 and are therefore made of the same material. However, their shapes are different such that the regular ribs 116 are harder to bend than the flexible ribs 115. Specifically, as illustrated in FIGS. 6A to 6D, while the head portion 105 presses the tip of a flexible rib 115, the direction of the pressing force as a vector includes a component that bends the flexible rib 115. As a result, the flexible rib 115 gets bent so as to narrow the angle θ1 (see FIG. 6A). As the head portion 105 of the ink cartridge 100 is further displaced similarly, the head portion 105 presses the regular rib 116. Here, the direction of the pressing force as a vector hardly includes a component that bends the regular rib 116. As a result, the regular rib 116 hardly gets bent. Although the direction of the pressing force as a vector includes a component compresses the regular rib 116, the regular rib 116 hardly gets compressed since the regular rib 116 is given such a Young's modulus as to hardly get compressed by the above component. At this moment, reaction forces opposed to each other are generated between the head portion 105 and the regular rib 116.

In the present embodiment, flexible ribs 115 and regular ribs 116 are arranged at positions on the inner side surface of the storage portion 112 that are in the periphery of the head portion 105, which is the most fragile portion of the ink cartridge 100. Only regular ribs 116 are arranged on the inner side surface of the storage portion 112 in regions other than the periphery of the head portion 105. The configuration may be such that flexible ribs 115 are arranged on the inner side surface of the storage portion 112 in the periphery of the head portion 105, and no regular rib 116 is arranged there. However, arranging regular ribs 116 as described above makes it possible to more reliably hold the posture of the ink cartridge 100. Still alternatively, two or more flexible ribs 115 may be provided on the abutting surface of the ink cartridge 100 such that the head portion 105 can enjoy the elastic effect of the flexible ribs 115 on the entire surface.

The height of some of the flexible ribs 115 is adjusted such that, in the state where the ink cartridge 100 is stored in the storage portion 112, upper ends 115*a* of the flexible ribs 115 support the shoulder portions 104*a* of the ink chamber 104 from below, as illustrated in FIGS. 5A and 5B. As a result, the gap g4 (see FIGS. 5A, 5B, and 7) is provided between the ejection port 106 and the bottom of the storage portion 112 in the state where the ink cartridge 100 is stored in the storage portion 112. This prevents the ejection port 106 from contacting the bottom of the storage portion 112.

As illustrated in FIGS. 5A and 5B, a slight gap g1 (a gap with the distance G1) is left between each of the flexible ribs 115 and the head portion 105 in the state where the ink cartridge 100 is stored in the storage portion 112. This follows what is schematically illustrated in FIG. 6A. Moreover, as illustrated in FIGS. 5A and 5B, a slight gap g2 is left between some of the regular ribs 116 and the ink chamber 104 of the ink cartridge 100 in the state where the ink cartridge 100 is stored in the storage portion 112. Furthermore, as illustrated in FIG. 5B, a gap g3 (a gap with the distance G3) wider than the gaps g1 and g2 is left between some of the regular ribs 116 and the head portion 105 in the state where the ink cartridge 100 is stored in the storage portion 112. This follows what is schematically illustrated in FIG. 6A as well.

The protruding height of the flexible ribs 115 may be adjusted so as not to leave the gap g1 in the state where the ink cartridge 100 is stored in the storage portion 112. Also, the protruding height of the regular ribs 116 may be adjusted so as not to leave the gap g2 in the state where the ink cartridge 100 is stored in the storage portion 112.

The width G3 of the gap g3 is greater than the width G1 of the gap g1. Thus, in a case when a shock is externally applied, the head portion 105 firstly comes into abutment with some of the flexible ribs 115. The head portion 105 then comes into abutment with some of the regular ribs 116 in a case where the shock is strong. These follow the description given with reference to FIGS. 6A to 6D.

Incidentally, in a case when the protruding heights of the flexible ribs 115 and the regular ribs 116 are adjusted such that the gaps g1 and g2 are equal to each other, then, which one of the gaps g1 and g2 will become zero first in response to external application of a shock varies depending on the situation. In a case when the protruding heights of the flexible ribs 115 and the regular ribs 116 are adjusted such that the gap g2 is wider than the gap g1, the gap g1 is more likely to become zero before the gap g2 does. Note that the order in which the gaps g1 and g2 become zero may be reversed depending on the position to which the shock is externally applied and/or the situation where the shock is externally applied. Conversely, in a case when the protruding heights of the flexible ribs 115 and the regular ribs 116 are adjusted such that the gap g1 is wider than the gap g2, the gap g2 is more likely to become zero before the gap g1 does. Note that the order in which the gaps g1 and g2 become zero may be reversed depending on the position to which the shock is externally applied and/or the situation where the shock is externally applied.

In any case, if a shock of certain intensity or higher is externally applied, some of the flexible ribs 115 get elastically deformed while supporting the head portion 105 of the ink cartridge 100, and the ink chamber 104 of the ink cartridge 100 comes into abutment with some of the regular ribs 116 with a reaction force acting on the ink chamber 104. In a case when the externally applied shock is stronger, the amount of deformation of the flexible ribs 115 increases, and the head portion 105 of the ink cartridge 100 also comes into abutment with the regular ribs 116 with a reaction force acting on the head portion 105.

FIGS. 8A to 8K are cross-sectional views of the flexible ribs 115-A to 115-K with various shapes. Each of these cross-sectional views is a cross-sectional view taken along a section perpendicular to the vertical extending direction of the flexible rib 115 (Z direction) along the inner side surface of the storage portion 112 of the storage container 110 (XY section). The flexible ribs 115 described above correspond to the flexible rib 115-A. In the present disclosure, the flexible ribs 115 may have various shapes and may have, for example, any of the shapes as represented by the flexible ribs 115-A to 115-K. Incidentally, in each of FIGS. 8A to 8K, the head portion 105 is not illustrated at a position facing the storage portion 112 with the flexible rib 115 therebetween, but is actually situated at such a position. Moreover, the inner surface of the storage portion 112 and the outer surface of the head portion 105 are parallel to each other.

The flexible rib 115-A has a flat plate portion obliquely facing the outer surface of the ink cartridge 100 in the state where the ink cartridge 100 is stored in the storage portion 112. This also applies to the flexible ribs 115-B, 115-C, 115-D, 115-F, 115-G, 115-H, and 115-I.

The flexible ribs 115-B and 115-G are characterized as follows. Specifically, the flexible ribs 115-B and 115-G have a first flat plate portion that extends from the inner surface of the storage portion 112, and obliquely faces the outer surface of the ink cartridge 100 in the state where the ink cartridge 100 is stored in the storage portion 112. The flexible ribs 115-B and 115-G have a second flat plate portion connected to the first flat plate portion. In the state where the ink cartridge 100 is stored in the storage portion 112, the second flat plate portion obliquely faces the outer surface of the ink cartridge 100 at a different tilt angle from the tilt angle of the first flat plate portion. The flexible ribs 115-B and 115-G have a third flat plate portion connected to the second flat plate portion. In the state where the ink cartridge 100 is stored in the storage portion 112, the third flat plate portion obliquely faces the outer surface of the ink cartridge 100 at a different tilt angle from the tilt angle of the second flat plate portion. Here, the connected edge portion between the first flat plate portion and the second flat plate portion will be referred to as "a first connected edge portion." Moreover, the connected edge portion between the second flat plate portion and the third flat plate portion will be referred to as "a second connected edge portion." Furthermore, the edge portion of the third flat plate portion opposed to the second connected edge portion will be referred to as "a free edge portion." The second connected edge portion is situated closer to the inner surface of the storage portion 112 than the first connected edge portion is. In the state where the ink cartridge 100 is stored in the storage portion 112, the first connected edge portion and the free edge portion are apart from the ink cartridge 100 to the same extent or in contact with the ink cartridge 100.

The flexible ribs 115-C and 115-H are characterized as follows. Specifically, the flexible ribs 115-C and 115-H have a first flat plate portion that extends from the inner surface of the storage portion 112, and obliquely faces the outer surface of the ink cartridge 100 in the state where the ink cartridge 100 is stored in the storage portion 112. The flexible ribs 115-C and 115-H have a second flat plate portion connected to the first flat plate portion. In the state where the ink cartridge 100 is stored in the storage portion 112, the second flat plate portion faces the outer surface of the ink cartridge 100 in parallel to the outer surface. In the state where the ink cartridge 100 is stored in the storage portion 112, the surface of the second flat plate portion on the ink cartridge 100 side is opposed to or in contact with the ink cartridge 100.

The flexible ribs 115-D and 115-I are characterized as follows. Specifically, the flexible ribs 115-D and 115-I have a first flat plate portion extending perpendicularly from the inner surface of the storage portion 112. The flexible ribs 115-D and 115-I have a second flat plate portion connected to the first flat plate portion. In the state where the ink cartridge 100 is stored in the storage portion 112, the second flat plate portion obliquely faces the outer surface of the ink cartridge 100. The flexible ribs 115-D and 115-I have a third flat plate portion connected to the second flat plate portion. In the state where the ink cartridge 100 is stored in the storage portion 112, the third flat plate portion faces the outer surface of the ink cartridge 100 in parallel to the outer surface. In the state where the ink cartridge 100 is stored in the storage portion 112, the surface of the third flat plate portion on the ink cartridge 100 side is opposed to or in contact with the ink cartridge 100.

The flexible ribs 115-E and 115-J are characterized as follows. Specifically, the flexible ribs 115-E and 115-J have a zigzag plate shape extending from the inner surface of the storage portion 112 toward the ink cartridge 100 in the state where the ink cartridge 100 is stored in the storage portion 112.

The flexible rib 115-K is characterized as follows. Specifically, the flexible rib 115-K has a hollow cylindrical shape with an opening provided at such a position as to be opposed to the ink cartridge 100 in the state where the ink cartridge 100 is stored in the storage portion 112.

The direction in which the flexible rib 115-A extends includes a component oblique to the outer surface of the ink cartridge 100 in the state where the ink cartridge 100 is stored in the storage portion 112 across the entire range of the flexible rib 115. This also applies to the flexible rib 115-F. On the other hand, the direction in which the flexible rib 115-B extends includes a component oblique to the outer surface of the ink cartridge 100 in the state where the ink cartridge 100 is stored in the storage portion 112 at some portions of the flexible rib. This also applies to the flexible ribs 115-C, 115-D, 115-G, 115-H, and 115-I.

In a case where the flexible ribs 115-B and 115-G are disposed at such positions as to be opposed to or in contact with the head portion 105 of the ink cartridge 100, the connected edge portion between the first flat plate portion and the second flat plate portion can receive the head portion 105 when a shock is externally applied. Moreover, the edge portion of the third flat plate portion opposed to the connected edge portion between the second flat plate portion and the third flat plate portion can receive the head portion 105 as well. In sum, two edge portions can receive the head portion 105. After these two edge portions of the flexible ribs 115-B and 115-G receive the head portion 105, the first flat plate portion to the third flat plate portion get bent until the connected edge portion between the second flat plate portion and the third flat plate portion comes into abutment with the inner surface of the storage portion 112. At this time, the first flat plate portion gets mainly bent since the first flat plate portion is longer than the second flat plate portion and the third flat plate portion. Thereafter, as the first flat plate portion to the third flat plate portion get bent further, they become harder to bend. In particular, the first flat plate portion hardly gets bent further. This increases the force required to bend the flexible ribs 115-B and 115-G. Specifically, the elastic force that receives the head portion 105 is stronger after the connected edge portion between the second flat plate portion and the third flat plate portion comes into abutment with the inner surface of the storage portion 112 than before the abutment. Thus, when a shock is applied, the flexible ribs 115-B and 115-G receive the head portion 105 with an elastic force that becomes stronger stepwise.

In a case when the flexible ribs 115-E and 115-J are disposed at such positions as to be opposed to or in contact with the head portion 105 of the ink cartridge 100, the flexible ribs 115-E and 115-J can receive the head portion 105 with a spring force until becoming fully compressed when a shock is externally applied.

In a case when the flexible rib 115-C is disposed at such a position as to be opposed to or in contact with the head portion 105 of the ink cartridge 100, the front surface of the second flat plate portion can receive the head portion 105 when a shock is externally applied. In sum, a surface can receive the head portion 105. This also applies to the flexible ribs 115-D, 115-H, and 115-I.

The storage portion 112 may include a combination of the flexible ribs with the various shapes illustrated in FIGS. 8A to 8K.

In the configuration described above, the flexible ribs 115 are provided in the periphery of a fragile portion (e.g., the head portion 105, at which the ink ejection port 106 is provided). In this way, even in a case when the ink cartridge 100 is heavy and is dropped, some of the flexible ribs 115 get bent and absorb the shock. This makes it possible to inexpensively prevent breakage of the ink cartridge 100 without having to add a new shock absorbing member.

Other Embodiments

The side surface of the storage portion 112 on the lower side in the cross-sectional view of FIG. 4A includes only one flexible rib 115 and only one regular rib 116. This is to avoid interference of flexible ribs 115 and regular ribs 116 with the protection tape 109. In a case when the protection tape 109 is not attached to the ink cartridge 100, flexible ribs 115 and regular ribs 116 may be disposed on the side surface on the lower side in the cross-sectional view of FIG. 4A like those on the upper side.

The above embodiment has been described taking an ink cartridge and a storage container as an example. However, the above embodiment is also applicable to liquid cartridges using liquids other than inks instead of inks and storage containers for these liquid cartridges. In this case, the ink chamber will be a liquid chamber, and the ink ejection port will be a liquid ejection port.

In the above embodiment, each regular rib 116 has a portion that is opposed to the head portion 105 and a portion that is opposed to or in contact with the ink chamber 104 in the state where the ink cartridge 100 is stored in the storage portion 112, and these portions are integrated with each other. Alternatively, these two portions may be separated. For example, between these two portions, a portion where the regular rib 116 is absent or a slit may be provided.

In the above embodiment, a configuration in which the head portion 105 is protected with the flexible ribs 115 and regular ribs 116 has been described. Alternatively, a portion of the ink cartridge other than the head portion 105 may be protected with flexible ribs 115 and regular ribs 116. Also, the present disclosure is applicable to storage containers for storing an ink cartridge that does not have the head portion 105.

In the above embodiment, the storage portion 112 includes multiple flexible ribs 115. The storage portion 112 also includes multiple regular ribs 116. However, the present disclosure is not limited to this case, and the number of flexible ribs 115 included in the storage portion 112 may be one. Also, the number of regular ribs 116 included in the storage portion 112 may be one. For example, in a case when the ink cartridge 100 only needs to be protected from shocks from one specific direction, the number of flexible ribs 115 included in the storage portion 112 may be one and the number of regular ribs 116 included in the storage portion 112 may be one.

In the description given with reference to FIGS. 8A to 8K, the inner surface of the storage portion 112 and the outer surface of the head portion 105 not illustrated are parallel to each other. However, the inner surface of the storage portion 112 may be tilted to some extent. Also, the outer surface of the head portion 105 may be tilted to some extent.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A storage container comprising:

a main body including:

a storage portion including a bottom and at least four side walls; and an opening portion facing the bottom; and a first rib being flexible and arranged so as to protrude from an inner surface of the side walls of the storage portion toward an inside of the storage portion and to extend from a position near the bottom of the storage portion toward the opening portion, wherein the direction in which the first rib protrudes from the inner surface of the storage portion toward the inside of the storage container includes a component oblique relative to the side walls, wherein the first rib includes:

a first flat plate portion protruding from the inner surface of the storage portion, and oblique relative to the inner surface;

a second flat plate portion connected to the first flat plate portion, and oblique relative to the inner surface at a tilt angle different from a tilt angle of the first flat plate portion; and a third flat plate portion connected to the second flat plate portion, and oblique relative to the inner surface at a tilt angle different from the tilt angle of the second flat plate portion, wherein a connected edge portion of the second flat plate portion and the third flat plate portion is located on an inner surface side of the storage portion more closely than a connected edge portion of the first flat plate portion and the second flat plate portion.

2. The storage container according to claim 1, further comprising a second rib arranged so as to protrude from the inner surface of the storage portion in a direction crossing the inner surface of the storage portion at an angle of eighty-five to ninety-five degrees.

3. The storage container according to claim 1, wherein the first rib has a flat plate portion oblique relative to the side walls.

4. The storage container according to claim 1, further comprising a lid with which to close the opening portion.

5. The storage container according to claim 1, wherein the main body has a plurality of the first ribs.

6. The storage container according to claim 1, wherein the storage container is made of polypropylene.

* * * * *